Figure 1:
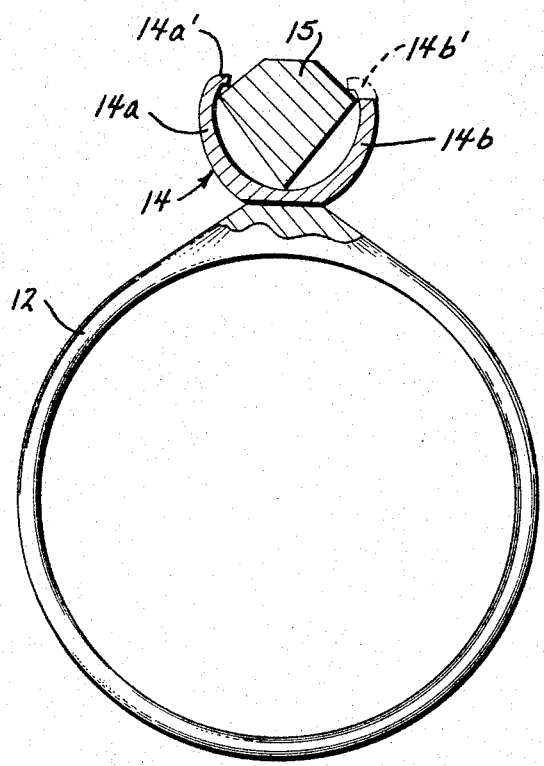

Aug. 1, 1967  D. A. WILLIAMS  3,333,321
JEWELRY REPAIR
Filed Jan. 18, 1965

INVENTOR.
DANIEL A. WILLIAMS
BY
*Haren D. Hackbert*
Attorney

United States Patent Office 3,333,321
Patented Aug. 1, 1967

3,333,321
JEWELRY REPAIR
Daniel A. Williams, 206 N. 3rd Ave.,
Evansville, Ind. 47710
Filed Jan. 18, 1965, Ser. No. 426,086
4 Claims. (Cl. 29—401)

The present invention relates to jewelry repair, and more particularly to a new and novel technique for re-tipping the points which retain a gem in its setting.

As is known, it is customary for the tips which normally maintain a gem in a setting, such as a ring mounting, for example, to wear through usage, providing a danger, if not attended to, in the possible loss of the gem. Actually, and more particularly, the tips typically wear to the surface of the mounted gem, providing, because of lack of a bearing point or points, a possible passage of the gem from the mounting through, for example, jarring action.

As is further known, it is conventional for jewelry repair craftsmen to re-tip the aforesaid points to prevent any such gem loss. However, up to this time, re-tipping has been accomplished, typically, through the use of a solder which matches material-wise the points of the setting, but, because the points may be close together, re-tipping becomes a real problem in that the solder runs and oftentimes ruins some of the already re-tipped points. In other words, previous approaches have prevented selective re-tipping because of the possible disadvantage of spoiling some of the work already completed.

Accordingly, by virtue of the instant invention, the applicant herein has provided a new and novel technique for re-tipping a gem setting, where the latter may be, for example, in the form of a ring mounting, a brooch, or any other desired form of jewelry. In any event, and briefly, the applicant provides a thin sheet of metal, such as gold, for example, where a sheet or layer of a fusible metal, such as a solder, is flowed thereon with the use of a flux.

The combined metal-solder sheet is rolled for smoothing, and, thereafter, punched from the solder layer side. The punch head is of a convex configuration, where the resulting punched piece appears as a convex disk looking towards the metal layer, and where the solder is disposed therebelow in a cupped or concave relationship.

In accordance with the further teachings of the invention, the aforesaid metal is heated after the combined punched piece is disposed where re-tipping is desired on the gem mounting. Specifically, the concave solder layer portion of the punched piece is disposed on the worn point, where the geometry of the over-all piece, upon heating, confines the solder flow, thereby effectively accomplishing re-tipping without any interpoint flow as has been the case with prior procedures. Obviously, the instant invention lends itself to ready repair techniques, to the benefit of the jewelry repair craftsmen and to the customer, as well.

Accordingly, the principal object of the present invention is to provide a new and novel jewelry repair.

Another object of the present invention is to provide a new and novel technique for re-tipping the points which normally secure a gem into a mounting.

A further and more general object of the present invention is to provide a new and novel approach for the effective re-tipping of a gem mounting point arrangement which obviates any interflow between the points thereof during the repair operation.

Figure 2:
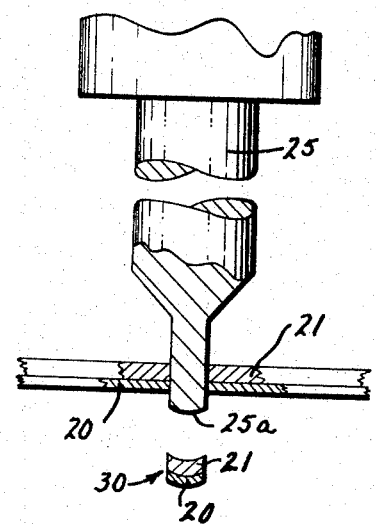

Other objects and a better understanding of the present invention will become more apparent from the following description, taken in conjunction with the accompanying drawing, wherein FIG. 1 is a view in elevation, partly in vertical cross-section, showing a typical gem mounting, and, in phantom lines, the position of a repaired tip thereof, in accordance with the teachings of the instant invention; and, FIG. 2 is a fragmentary view, partly in vertical section, showing a punch employed in the applicant's new and novel invention, and the resulting punched piece.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now to the figures, the applicant's new and novel jewelry repair is shown in conjunction with a ring mounting for a gem, comprising, conventionally, a finger encircling band 12, having a setting 14 secured thereto. It should be understood that a wide variety of settings 14 are available, and that FIG. 1 discloses a gem 15 secured by tips 14a'–14b', respectively disposed at the end of a plurality of retaining arms 14a and 14b (the only two which are disclosed in the drawing).

In any event, retaining arm 14a is shown, by way of example, in a new condition, while retaining arm 14b, where cross-sectioned, typifies the wear that a tip receives during normal usage. In this connection, it might be observed that the wear level generally approximates the surface of the contained gem 15. The problem, therefore, is providing a new tip for a used tip, so that the gem 15 can be safely carried on the mounting.

In accordance with the practice of the new and novel invention at hand, a sheet of metal 20 is provided, typically the same type as the mounting, as gold, for example. The metal sheet 20 is then made multi-level by flowing solder 21 thereon, conventionally through the use of a flux material. The combined metal-solder sheet 20–21 is then rolled for smoothing and, thereafter, placed below a punch 25 having an extending convex punching surface 25a.

As should be apparent from FIG. 2, during downward movement of the punch 25, a punched piece 30 results having the appearance of a convex disk from the metal sheet 20 side thereof, while the solder sheet 21 thereof is concave in form. The latter relationship is particularly important in carrying out the invention, where the punched piece 30 is disposed, in the phantom-lined position of FIG. 1, for the re-tipping operation so that the concave surface of the solder sheet 21 is downward, harmonizing the metal sheet 20 with the remainder of the mounting.

Upon heating, the solder sheet 21 assumes a molten state, but is confined at the desired re-tipping location because of its cupped relationship within the metal sheet 20. Importantly, no interflow from point to point results. In this over-all consideration, it must be understood that the punched piece 30 is largely exaggerated in the figures for purposes of explanation, and that normally, it is hardly discernible, without an eye piece, by the average person.

From the preceding, it should be apparent that the applicant has provided a new and novel jewelry repair technique which is increasingly important with the number of tips involved in any given setting. For example, and as stated, where a cluster has a wide number of gems disposed thereon, interpoint flow has been a serious problem, but because of the invention at hand, the over-all re-tipping operation is now readily and effectively accomplished, with highly desirable end results.

The jewelry repair disclosed hereabove is, of course, susceptible to various changes within the spirit of the invention. For example, the metal and solder sheet thicknesses may be varied and curvature angle reproportioned, depending upon the particular installation. Accordingly, the preceding description should be considered illustrative, and not as limiting the scope of the following claims.

I claim:

1. A re-tipped point for a gem mounting comprising, in combination, a worn point, and a replacement point disposed on said worn point, said replacement point having a layer of fusible metal and a layer of another metal combined together in cupped relationship, and said layer of fusible metal having a concave portion in heat fusing engagement with said worn point.

2. A method of re-tipping a gem mounting which comprises the steps of combining a fusible metal layer with another metal layer, punching a piece from said combined fusible metal layer and another metal layer having a portion of said fusible metal layer in a cupped relationship with said another metal layer, disposing said cupped shape fusible metal portion onto said gem mounting, and heating said another metal layer of said piece.

3. A method of re-tipping a gem mounting which comprises the steps of combining a fusible metal with another metal in a multi-layer arrangement, forming a concave portion of fusible metal in a cupped relationship with said another metal, disposing said concave portion onto a worn gem mounting point, and heating said combined fusible metal and said another metal.

4. A method of re-tipping a gem mounting which comprises the steps of cupping a fusible metal with respect to another metal, disposing said cupped fusible metal into engagement with said gem mounting, and fusing said fusible metal thereto.

References Cited

UNITED STATES PATENTS

| | | | |
|---|---|---|---|
| 1,093,698 | 4/1914 | Heaton | 29—160.6 |
| 1,378,501 | 5/1921 | Wall | 29—160 X |

JOHN F. CAMPBELL, *Primary Examiner.*

THOMAS H. EAGER, *Examiner.*